United States Patent [19]

Yoshitsugu et al.

[11] 4,206,886
[45] Jun. 10, 1980

[54] LOCKING DEVICE FOR SEATBELT SYSTEMS

[75] Inventors: Noritada Yoshitsugu; Jun Yasumatsu; Mitsuaki Katsuno, all of Toyota; Yoshio Tsujiuchi, Nagoya, all of Japan

[73] Assignees: Toyota Jidosha Kogyo Kabushiki Kaisha; Kabushiki Kaisha Tokai Rika Denki, both of Aichi, Japan

[21] Appl. No.: 871

[22] Filed: Jan. 4, 1979

[30] Foreign Application Priority Data

Mar. 28, 1978 [JP] Japan .............................. 53-40620[U]

[51] Int. Cl.$^2$ ...................... B65H 75/48; A62B 35/02
[52] U.S. Cl. ................................................. 242/107.2
[58] Field of Search .................... 242/107.2, 107.4 R, 242/107.4 B, 107.4 A, 107.4 C–107.4 E; 297/388; 188/65.1, 72.9, 188; 280/802–803, 806, 807, 808

[56] References Cited

U.S. PATENT DOCUMENTS

| | | | |
|---|---|---|---|
| 3,286,946 | 11/1966 | Board et al. | 242/107.2 |
| 3,817,473 | 6/1974 | Board et al. | 242/107.2 |
| 3,847,434 | 11/1974 | Weman | 242/107.2 X |
| 4,120,466 | 10/1978 | Adomeit | 242/107.2 |

Primary Examiner—John M. Jillions
Attorney, Agent, or Firm—Koda and Androlia

[57] ABSTRACT

A seatbelt locking device for seatbelt systems including an arm rotatably supported on a frame which rotatably supports a seatbelt retractor shaft. One end of the arm contacts an unretracted portion of the seatbelt and detects the tension on the unretracted portion of the seatbelt. The arm, seatbelt and frame are arranged and configured such that the seatbelt is clamped and securely locked between the end of the arm and the frame when the tension of the seatbelt exceeds some predetermined amount during a vehicular emergency.

2 Claims, 10 Drawing Figures

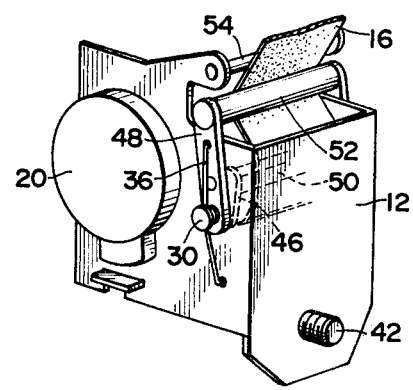
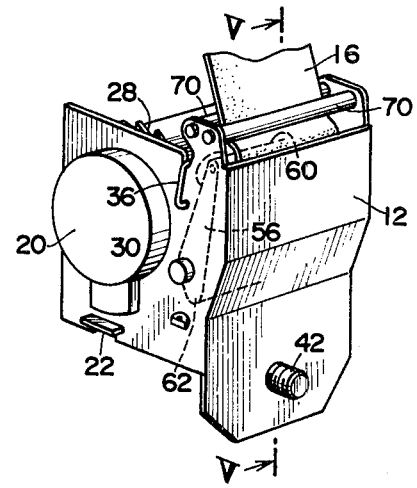
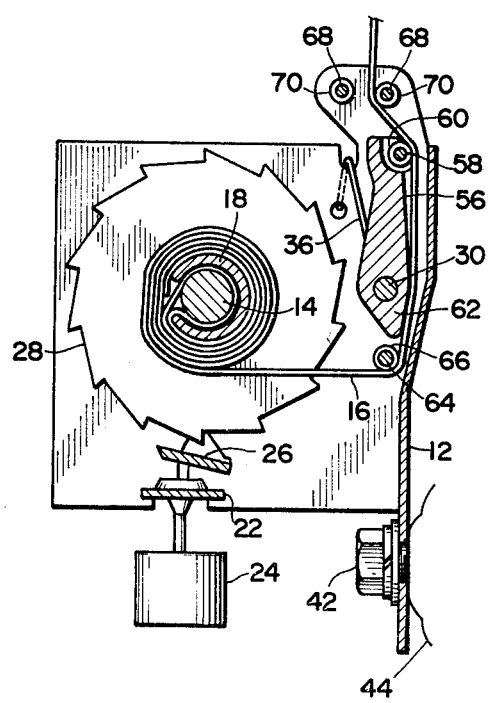

LOCKING DEVICE FOR SEATBELT SYSTEMS

BACKGROUND OF THE INVENTION

1. Field of the Invention

This invention relates to seatbelt systems and more particularly to locking devices for seatbelt retractors.

2. Prior Art

Generally, seatbelt systems are designed such that one end of the passenger-restraining belt is retracted with a specific amount of force on a retractor fastened to the vehicle so that tension is always placed on an intermediate portion of the seatbelt. This tension causes the intermediate portion of the seatbelt to press against the body of the passenger so that the passenger is in a seatbelt-fastened condition. Furthermore, when the passenger removes the seatbelt, the seatbelt is automatically retracted and stored.

Recently, however, the low percentage of passenger use has led to the use of the so-called passive seatbelt systems which force the passenger to wear the seatbelt after entering the vehicle. Such passive seatbelt systems are arranged such that when the passenger enters the vehicle, the seatbelt is caused to move toward the front of the vehicle so that a sufficient space for the passenger to enter or leave the vehicle is formed between the seatbelt and the passenger seat. When the passenger slides his body into the space so that he is seated, the seatbelt is caused to move back toward the passenger seat. Accordingly, the space in front of the passenger contracts so that an intermediate portion of the seatbelt is fastened around the passenger thereby automatically placing the passenger in a seatbelt fastened condition. If the vehicle is involved in an emergency such as a collision and the seatbelt has been fastened around the passenger, a pawl actuated by an inertia sensor is caused to engage with ratchet wheels fastened to the seatbelt retractor shaft inside the retractor so that the rotation of the retractor shaft in the direction of seatbelt extension is abruptly stopped. Accordingly, extension of the webbing is prevented and the passenger is restrained.

In such passive seatbelt systems, however, the seatbelt is caused to move a great distance when the passenger enters or leaves the vehicle. As a result, the amount of seatbelt retracted on the retractor is extremely large in comparison to the amount retracted in an ordinary seatbelt systems. For this reason, the webbing retracted on the retractor shaft continues to be extended even after the rotation of the retractor shaft in the direction of the seatbelt extension has been stopped during a vehicle emergency. The extension continues until the seatbelt is tightly wound on the retractor shaft. In other words, the seatbelt is tightened on the retractor shaft so that a length of seatbelt corresponding to the amount by which the seatbelt is tightened is continued to be extended from the retractor. As a result, such passive seatbelt systems suffer from a drawback of incomplete passenger restraint.

SUMMARY OF THE INVENTION

Accordingly, it is the general purpose of the present invention to provide a seatbelt locking device which makes it possible to restrain the passenger securely by directly locking the unretracted portion of the seatbelt so that the seatbelt is immediately locked during a vehicle emergency.

In keeping with the principles and objects of the present invention, the objects are accomplished by unique seatbelt locking device for seatbelt systems including an arm rotatably supported on a frame which rotatably supports a seatbelt retractor shaft. One end of the arm contacts an unretracted portion of the seatbelt and detects the tension on the unretracted portion of the seatbelt. The arm, seatbelt and frame are arranged and configured such that the seatbelt is clamped and securely locked between the end of the arm and the frame when the tension on the unretracted portion of the seatbelt exceeds some predetermined amount during a vehicle emergency.

BRIEF DESCRIPTION OF THE DRAWINGS

The above mentioned features and objects of the present invention will become more apparent with reference to the following description taken in conjunction with the accompanying drawings wherein like reference numerals denote like elements, and in which:

FIG. 4 is an oblique view of the embodiment shown in FIG. 3;

FIG. 5 is a cross section illustrating a third embodiment of the seatbelt locking device in accordance with the teachings of the present invention;

FIG. 6 is an oblique view of the embodiment of FIG. 5;

DETAILED DESCRIPTION OF THE INVENTION

Figure 1:
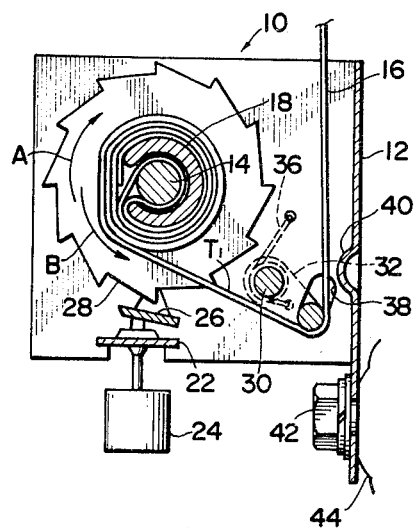
FIG. 1 is a cross section illustrating a first embodiment of the seatbelt locking device in accordance with the teachings of the present invention.
Figure 2:
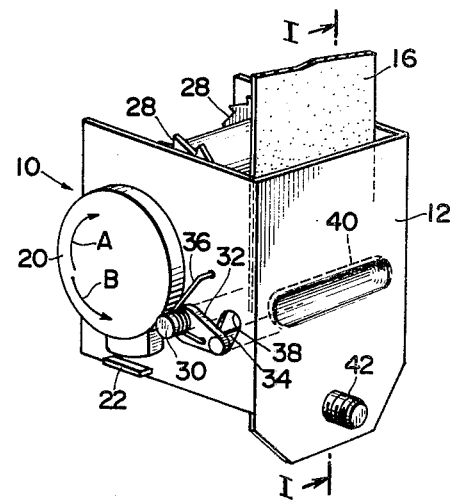
FIG. 2 is an oblique view of the device of FIG. 1.

Referring more particularly to the figures, shown in FIGS. 1 and 2 are a first embodiment of a seatbelt locking device in accordance with the teachings of the present invention. In this embodiment, the locking device is incorporated into a retractor 10.

In the retractor 10 is provided a frame 12 made of sheet metal which supports a retractor shaft 14. One end of the passenger restraining seatbelt 16 is retracted onto the retractor shaft 14. Furthermore, this end of the seatbelt 16 is secured to the retractor shaft 14 by being passed through and around a C-shaped stopper 18 from above. Furthermore, a spring-driven retractor mechanism 20 is fastened to the side of frame 12 and connects with an end of the retractor shaft 14 which projects through the frame 12. The mechanism 20 powers the retractor shaft 14 in the direction of seatbelt retraction (i.e., in the direction indicated by arrow A). Accordingly, the passenger can put the seatbelt into use by pulling the other end of the seatbelt (not shown in the Figures) against the force of the spring-driven retractor mechanism 20 (i.e., by pulling the seatbelt in the direction indicated by arrow B) and adjusting the length of the unretracted portion of the webbing (i.e., the portion of the webbing not retracted on the retractor shaft 14).

A bracket 22 is installed across the bottom of the frame 12. A pendulum 24 is suspended from the bracket 22. A pawl 26 which is supported such that it inclines on the frame 12 is installed above the pendulum 24. This pawl 26 faces a pair of ratchet wheels 28 fastened to the retractor shaft 14. Accordingly, as long as the pendulum 24 is maintained in a perpendicular position, the pawl 26 is maintained by its own weight in a roughly horizontal position so that it is slightly separated from the circumference of the ratchet wheels 28. When the vehicle is involved in an emergency such as a collision, the pendulum 24 swings so that the pawl 26 is pushed upward. As a result, the pawl 26 is caused to incline such that it engages with the ratchet wheels 28 thereby stopping the rotation of the ratchet wheels 28 and the retractor 14 in the direction of seatbelt extension.

An arm 32 is rotatably supported by a pin 13 in the frame 12. A seatbelt turning shaft 34 is provided on a swinging end of the arm 32 and the seatbelt 16 is turned around the shaft 34. A torsion coil spring 36 is installed between the arm 32 and the frame 12 such that the arm 32 is driven in a clockwise direction about the pin 30. The rotation of the arm 32 in a clockwise direction is checked by contact with one end of a slot 38 in the frame 12 through which the seatbelt turning shaft 34 is passed. The arm 32 receives a constant rotational force which causes it to rotate in a counterclockwise direction from the tension on the seatbelt 16 which is transmitted to the seatbelt-turning shaft 34. As long as the tension on the seatbelt 16 is below a specific value, the torsion spring 36 overcomes the torque imparted by the seatbelt and the seatbelt turning shaft 34 is pushed toward the end of the slot 38. When the tension on the seatbelt 16 exceeds a specific value, the arm 32 is caused to rotate in counterclockwise direction against the force of the torsion spring 36 so that the arm 32 approaches a projection 40 formed in a portion of the frame 12. Such a retractor 10 is to be appropriately installed in a vehicle by fastening the frames 12 to the vehicle 44 by means of the fastening bolt 42.

In operation, when the passenger extends the seatbelt 16 from the retractor 10 in order to put the seatbelt into use, the tension on the seatbelt 16 is small. Accordingly, the arm 32 does not rotate and the seatbelt turning shaft 34 is kept away from the projection 40 such that the seatbelt 16 can pass through the space between the shaft 34 and the projection 40. As a result, the passenger can freely adjust the length of the seatbelt 16 that is fastened around his body.

When the vehicle is involved in an emergency such as collision, the passenger is thrown violently in the direction of impact. This motion of the passenger causes the seatbelt 16 to abruptly extend from the retractor 14. Simultaneously, the swing of the pendulum 24 which detects the acceleration of the vehicle causes the pawl 26 to engage with the ratchet wheels 28 so that the rotation of the ratchet wheels 28 and the retractor shaft 14 in the direction of the webbing extension is instantly stopped. Accordingly, the tension on the seatbelt 16 which attempts to move abruptly in the direction of extension from the retractor 14 is instantly increased. This tension increase is transmitted to the arm 32 via the seatbelt turning shaft 34 so that the arm 32 is caused to rotate in a counterclockwise direction against the force of the torsion coil spring 32. As a result, the arm 32 approaches the projection 40. As a result, an intermediate portion of the seatbelt 16 is clamped between the seatbelt turning shaft 34 and the projection 40 so that the seatbelt 16 is placed in a locked condition in which movement of the seatbelt 16 is prevented. Thus, the seatbelt 16 is stopped by this clamped portion such that there is no increase in the length of the portion of the seatbelt 16 worn by the passenger. As a result, the passenger is securely restrained. In other words, extension of the seatbelt from the retractor due to the tightening of the seatbelt retracted on a retractor shaft 14 resulting from the direct transmission of the seatbelt tension to the portion of the seatbelt retracted on the retractor shaft 14 is completely eliminated.

In the above-described embodiment, the arm 32 rotates in a counterclockwise direction and remains in contact with the projection 40 as it clamps the seatbelt 16. Accordingly, the clamping force on the seatbelt 16 increases as the arm 32 rotates further in a counter clockwise direction. As a result, the seatbelt 16 is placed in a self-locked condition such that the lock on the seatbelt 16 is secured. Furthermore, in the above-described embodiment, it would also be possible to make the circumference of the seatbelt turning shaft 34 in a form which will create a frictional resistance between the shaft 34 and the seatbelt 16 (i.e., an uneven surface, a knurled surface, etc.) such that the tension on the seatbelt 16 is effectively transmitted to the arm 32.

Figure 3:
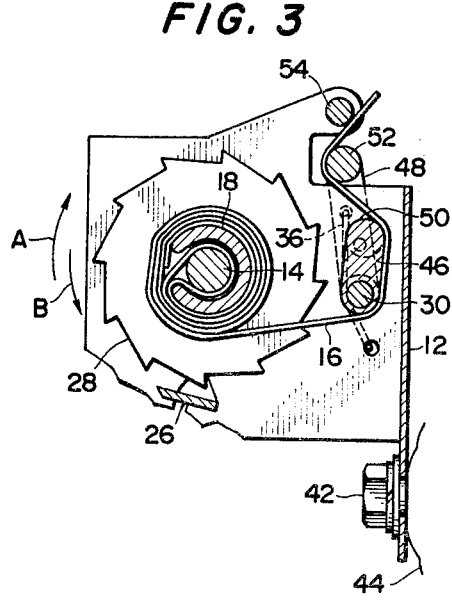
FIG. 3 is a cross section illustrating a second embodiment of the seatbelt locking device in accordance with the teachings of the present invention.

Referring to FIGS. 3 and 4 shown therein is a second embodiment of a locking device in accordance with the teachings of the present invention. In this second embodiment, arms 46 and 48 are utilized instead of the arm 32. The arms 46 and 48 are fastened to each other such that they are inclined at a specified angle relative to each other and such that they rotate as a unit about the pin 30. A seatbelt turning shaft 50 is fastened to the radial end of the arm 46 and a seatbelt turning shaft 52 is fastened the radial end of the arm 48. A seatbelt 16 extends from the retractor shaft 14 and is turned around the respective seatbelt turning shafts 50 and 52 in order. However, the seatbelt 16 is turned around the seatbelt turning shaft 52 in an opposite direction from the direction in which it is turned around the seatbelt shaft 50. Specifically, as shown in FIG. 3, when the tension on the seatbelt 16 is increased, the seatbelt tension acting on the seatbelt turning shaft 50 tends to cause the arm 46 to rotate in a counterclockwise direction about the pin 30 while the same tension acting on the seatbelt turning shaft 52 tends to cause the arm 48 to rotate in a clockwise direction. However, since the two arms 46 and 48 are originally fastened to each other and since the arm 48 is longer than the arm 46, both arms 46 and 48 rotate as a unit in a clockwise direction about the pin 30 when the tension on the seatbelt 16 exceeds a given value. As a result, when the tension on the seatbelt 16 exceeds a given value, the seatbelt turning shaft 50 approaches the frame 12 and locks an intermediate portion of the seatbelt 16.

In this embodiment, as in the first embodiment, it is possible to lock an intermediate portion of the seatbelt 16 during a vehicular emergency so that the passenger is instantaneously restrained by the webbing. In this embodiment, however, a higher seatbelt tension can be detected than in the first embodiment. Specifically, the tension on the seatbelt is highest in the section of the seatbelt 16 extending from the seatbelt turning shaft 52 to the portion of the seatbelt which restrains the passenger. This high tension is reduced by contact resistance resulting from contact between the seatbelt 16 and the seatbelt turning shafts 50 and 52 such that the lowest tension on the seatbelt 16 is in the section of the seatbelt 16 extending from the seatbelt turning shaft 50 to the retractor 14. Accordingly, it is possible in this embodiment to detect the highest tension on the seatbelt 16, i.e. the tension on the section of the seatbelt 16 extending from the seatbelt turning shaft 52 to the passenger. As a result, the amount of time required in order to clamp and lock an intermediate portion of the seatbelt during the vehicular emergency is extremely small in this embodiment. Furthermore, in this embodiment the retractor is provided with a guide shaft 54 for the purpose of guiding the intermediate portion of the seatbelt extending from the seatbelt turning shaft 52 to that portion of the seatbelt which restrains the passenger.

Referring to FIGS. 5 and 6, shown there is a third embodiment of a seatbelt locking device in accordance with the teachings of the present invention. In this third embodiment, an arm 56 is supported on a frame 12 by means of pin 30. A roller 60 is supported on one end of the arm 56 by means of a pin 58. The opposite end of the arm 56 on the opposite side of the pin 30 from the roller 60 is formed into a projecting part 62. Accordingly, unretracted portion of the seatbelt 16 extends from the retractor 14 to the passenger restraining portion of the seatbelt 16 via the projecting part 62 and the roller 60.

In this embodiment, the section of the seatbelt 16 extending from the retractor shaft 14 to the projecting part 62 is turned around a roller 66 supported on the frame 12 by means of a pin 64 and the section of the seatbelt 16 extending from the roller 60 to the passenger is caused to pass between the guide rollers 70 supported on the two pins 68 mounted on the frame 12 so that the direction of the movement of each of the sections of the seatbelt 16 is guided. This arrangement is provided so that it prevents a large resistance from being imparted to the unretracted portion of the seatbelt 16 by the rollers 60, 66, and 70. Furthermore, a torsion coil spring 36 is installed between the arm 56 and the frame 12 so that the arm 56 is driven in a clockwise direction about the pin 30. As a result, the projecting part 62 is kept away from the frame 12.

Accordingly, in this embodiment as well as there described above, an increase in the tension on the seatbelt 16 beyond a given value is detected by the roller 60 which causes the arm 56 to rotate in a counterclockwise direction about the pin 30 such that the projecting part 62 clamps and locks the seatbelt 16 between itself and the frame 12. In this embodiment, when the seatbelt 16 is clamped between the projecting part 62 and the frame 12, further movement of the seatbelt 16 toward the passenger-restraining portion of the seatbelt 16 causes the projecting part 62 to approach even closer to the frame 12. Thus, as in the first embodiment, the seatbelt is placed in a so-called self-locked condition. As a result, the locking effect on the seatbelt 16 is secured. Furthermore, by making the distance between the pin 30 and the roller 60 longer than the distance between the pin 30 and the particular parts 62, it is possible to increase the force with which the seatbelt 16 is clamped between the projecting part 62 and the frame 12.

Figure 7:
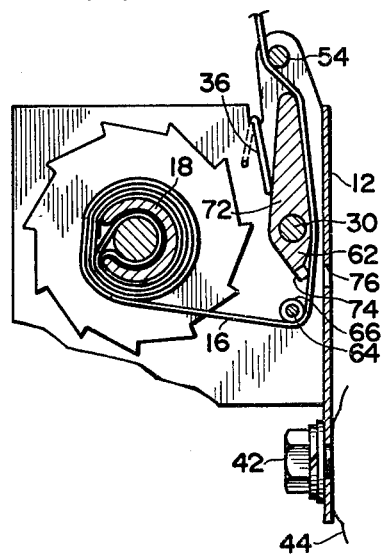
FIG. 7 is a cross section illustrating a fourth embodiment of the seatbelt locking device in accordance with the teachings of the present invention.
Figure 8:
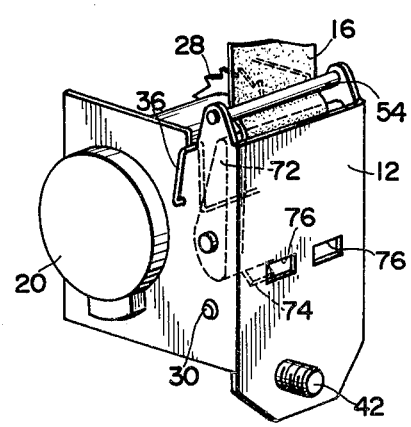
FIG. 8 is an oblique view of the embodiment of FIG. 7.

Referring more particularly to FIGS. 7 and 8, shown therein is a fourth embodiment of a seatbelt locking device in accordance with the teachings of the present invention. In this fourth embodiment, an arm 72 is used which is similar to the arm used in the third embodiment described above. In this embodiment, however, teeth 74 shaped like the teeth of a comb are attached to the projecting part 62. When the arm 72 is caused to rotate, these teeth 74 are inserted into rectangular windows 76 formed in the frame 12. Accordingly, when the arm 72 is caused to rotate by the tension on the seatbelt 16, the teeth 74 attached to the projecting part 62 to form an immediate portion of the seatbelt 16 so that the seatbelt 16 is pushed into the rectangular windows 76. As a result, the sliding resistance resulting from the contact between the seatbelt 16 and the rectangular windows 76 is very great and the seatbelt 16 is securely locked. The rectangular window 76 may be formed by cut-out slots in the frame 12 or may be recesses in the frame 12 into which the teeth 74 can be inserted.

Figure 9:
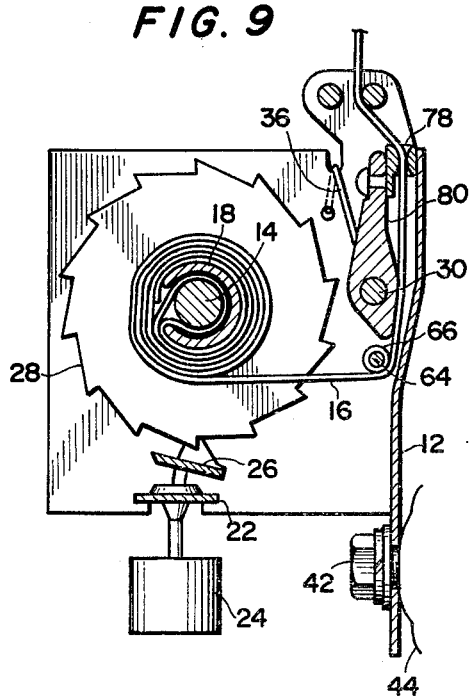
FIG. 9 is a cross sectional view illustrating a fifth embodiment of the seatbelt locking device in accordance with the teachings of the present invention.
Figure 10:
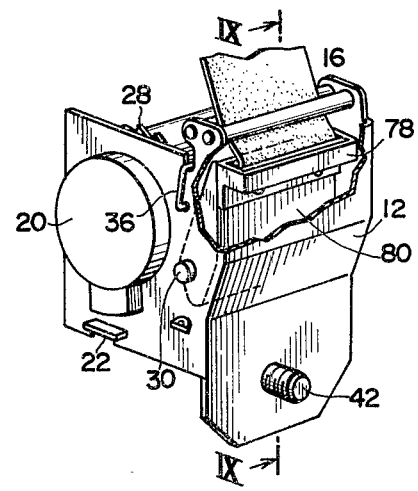
FIG. 10 is an oblique view of the embodiment of FIG. 9.

Referring to FIGS. 9 and 10, shown therein is a fifth embodiment of a seatbelt locking device according to the teachings of the present invention. In this embodiment, an arm 80 is used which has a guide 78 attached to its tip. A roughly rectangular seatbelt passage is formed in the guide 78. Accordingly, movement of the seatbelt 16 is guided such that movement of the seatbelt in the direction of the width and thickness of the seatbelt is kept within specified limits. As a result, the tension on the seatbelt 16 is effectively transmitted to the arm 80. In this fifth embodiment, therefore, seatbelt 16 is prevented from moving into the direction of the width of the seatbelt 16 as the seatbelt does in each of the above described embodiments. As a result, it is possible to obtain even more secure seatbelt lock.

From the above, it should be apparent that the seatbelt locking device in accordance with the teachings of the present invention securely looks the unretracted portion of the seatbelt extending to the vicinity of the retractor shaft between a rotatable arm and the frame of the retractor. As a result, this invention possesses superior merit in that during a vehicular emergency, the passenger is securely restrained to thereby reduce the distance which the passenger moves and to improve the passenger safety.

We claim:
1. A seatbelt locking device for a vehicle comprising:
a frame which is attached to the vehicle;
a retractor shaft which is supported on the frame and which retracts a passenger-restraining seatbelt;
a first locking arm which is pivotably supported on the frame;
a first seatbelt-turning part coupled to the tip of the locking arm and around which an unretracted portion of the seatbelt is turned, said first seatbelt-turning part being further coupled to said first locking arm such that said first locking arm is caused to rotate when the tension on the unretracted portion of the seatbelt reaches a specified value whereby the seatbelt is clamped and locked between the first seatbelt-turning part and the frame; and
a second locking arm on whose tip is installed a second seatbelt-turning part fastened to the first locking arm so that the two locking arms are inclined at a specified angle relative to each other, and wherein the unretracted portion of the seatbelt which is turned around the first seatbelt-turning part in one direction is turned around the second seatbelt-turning part in an opposite direction.

2. A locking device as defined in claim 1, wherein the second locking arm is longer than the first locking arm.

* * * * *